(12) United States Patent
Murphy et al.

(10) Patent No.: US 8,704,765 B1
(45) Date of Patent: Apr. 22, 2014

(54) METHODS AND APPARATUS RELATED TO CURSOR DEVICE CALIBRATION

(75) Inventors: Glen Murphy, Palo Alto, CA (US);
Ryan Tabone, San Francisco, CA (US);
Nicholas Jitkoff, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/246,230

(22) Filed: Sep. 27, 2011

Related U.S. Application Data (63) Continuation of application No. 13/082,329, filed on Apr. 7, 2011.

(51) Int. Cl.
*G06F 3/033* (2013.01)

(52) U.S. Cl.
USPC .......................................... 345/157

(58) Field of Classification Search
None
See application file for complete search history.

(56) References Cited

U.S. PATENT DOCUMENTS

| | | | |
|---|---|---|---|
| 5,162,781 A * | 11/1992 | Cambridge | 345/163 |
| 5,515,040 A | 5/1996 | Lee et al. | |
| 5,661,502 A | 8/1997 | Cheng | |
| 7,194,702 B1 * | 3/2007 | Peasley | 715/856 |
| 2001/0042245 A1 | 11/2001 | Iwamura | |
| 2004/0001044 A1 * | 1/2004 | Luciani et al. | 345/157 |
| 2007/0188459 A1 | 8/2007 | Bells et al. | |
| 2008/0320125 A1 * | 12/2008 | O'Sullivan et al. | 709/224 |

* cited by examiner

*Primary Examiner* — William Boddie
*Assistant Examiner* — Carolyn R Edwards
(74) *Attorney, Agent, or Firm* — Brake Hughes Bellermann LLP (57) ABSTRACT

In one general aspect, a computer-readable storage medium can store instructions that when executed cause a computing device to perform a process. The instructions can include instructions to receive a cursor behavior representing an interaction with a user interface where the interaction is triggered via a cursor device. The instructions can include instructions to identify a deviation of the cursor behavior from an expected cursor behavior, and calculate a cursor value related to a responsiveness of the cursor device based on the deviation.

19 Claims, 7 Drawing Sheets

| Cursor Responsiveness Parameters 510 | Cursor Values 520 |
|---|---|
| Sensitivity | A1 |
| Horizontal Scalar | A2 |
| Vertical Scalar | A3 |
| Double-Click Speed | A4 |
| Acceleration | A5 |

FIG. 8

METHODS AND APPARATUS RELATED TO CURSOR DEVICE CALIBRATION

CROSS-REFERENCE TO RELATED APPLICATIONS

This application is a continuation of U.S. Non-Provisional patent application Ser. No. 13/082,329, filed Apr. 7, 2011, entitled, "METHODS AND APPARATUS RELATED TO CURSOR DEVICE CALIBRATION," which is incorporated by reference herein in its entirety.

TECHNICAL FIELD

This description relates to calibration of a cursor device associated with a computing device.

BACKGROUND

Many known computing devices (e.g., cellphones, tablets, laptop computers) can have several mechanisms through which a user may interact with and/or use (e.g., trigger) one or more functions of the computing device. Specifically, a user may perform one or more computing functions using a cursor device (e.g., a mouse device, a touchpad device) that can be integrated into or in communication with a computing device. However, these cursor devices may be cumbersome to use and/or may not produce results at a desirable speed, level of accuracy, and/or with a desired effect. For example, known cursor device programs may be associated with default settings, or customized settings, that are not appropriately tuned to the physical movements and/or visual perceptions of a user using the cursor device. The mismatch in the settings with the physical movements and/or visual perceptions of the user can result in the difficulties for the user to accurately select portions of a user-interface, trigger functions of the computing device, and/or so forth.

SUMMARY

In one general aspect, a computer-readable storage medium can store instructions that when executed cause a computing device to perform a process. The instructions can include instructions to receive a cursor behavior representing an interaction with a user interface where the interaction is triggered via a cursor device. The instructions can include instructions to identify a deviation of the cursor behavior from an expected cursor behavior, and calculate a cursor value related to a responsiveness of the cursor device based on the deviation.

In another general aspect, an apparatus can include an error behavior module configured to compare a cursor behavior with a predefined error behavior where the cursor behavior can be triggered by a user of a computing device via a cursor device. The error behavior module can be configured to identify the cursor behavior as being an error behavior based on the comparison. The apparatus can include a cursor value calculator configured to calculate, in response to the identification of the cursor behavior as being an error behavior, a cursor value related to a responsiveness of the cursor device based the cursor behavior.

In yet another general aspect, a computer-readable storage medium can store instructions that when executed cause a computing device to perform a process. The instructions can include instructions to receive a plurality of cursor device profiles associated with a cursor device type. A cursor device profile from the plurality of cursor device profiles can include at least one cursor value related to a responsiveness of the cursor device type and can be defined based on a cursor device calibration feedback loop. The instructions can include instructions to define a default cursor device profile for the cursor device type based on the plurality of cursor device profiles.

The details of one or more implementations are set forth in the accompanying drawings and the description below. Other features will be apparent from the description and drawings, and from the claims.

DETAILED DESCRIPTION

Figure 1:
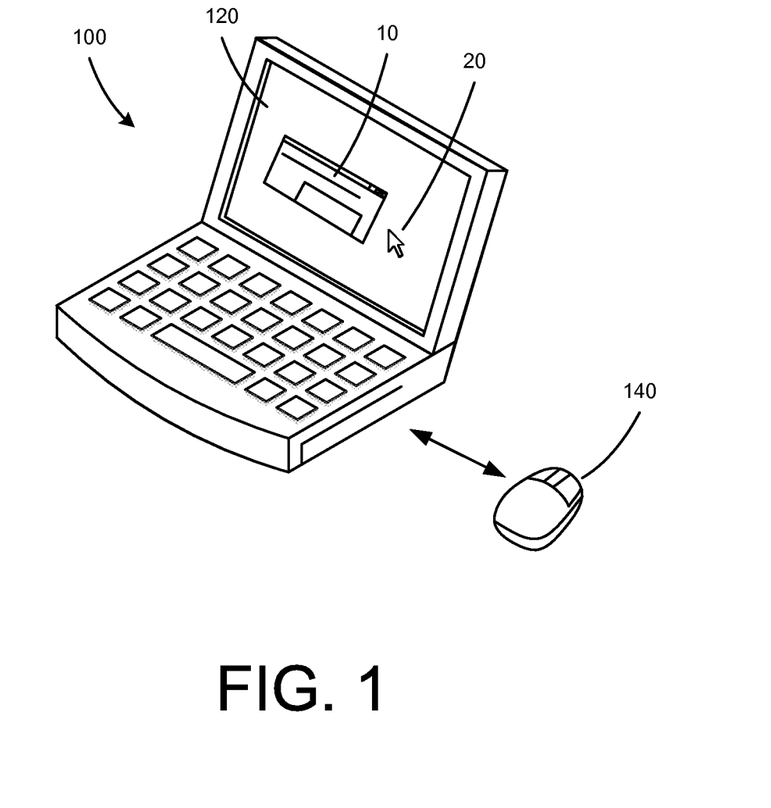
FIG. 1 is a diagram that illustrates a cursor device configured to control a cursor of a computing device.

FIG. 1 is a diagram that illustrates a cursor device 140 configured to control a cursor 20 of a computing device 100. As shown in FIG. 1, the cursor device 140 is a mouse device configured to wirelessly trigger the cursor 20 to move within a display 120 of the computing device 100. The cursor device 140 can be used to select, via the cursor 20, one or more portions of a user interface 10 associated with an application operating at the computing device 100. Although the cursor 20 shown in FIG. 1 is represented as an arrow icon, many different types of graphic and/or icons can be used to represent, or function as, a cursor.

Movement of the cursor 20 within the display 120 of the computing device 100 and/or interactions of the cursor 20 with the user interface 10 displayed at the computing device 100 can be referred to as a cursor behavior and can be triggered by a user using the cursor device 140. Accordingly, the behavior of the cursor 20 within the display 100 (and with respect to the user interface 10) can be a user-triggered behavior.

The behavior (e.g., interactions) of the cursor 20 in response to movements of the cursor device 140 caused by the user can be implemented based on one or more cursor values stored within a cursor profile associated with the cursor device 140. The behavior of the cursor 20 in response to movements of the cursor device 140 can be referred to as the responsiveness of the cursor device 140, and the cursor values can be used to define at least some aspects of the responsiveness of the cursor 20 to the cursor device 140. Specifically, the cursor values can be associated with cursor responsive parameters such as sensitivity, acceleration, minimum and maximum cursor speed, and/or so forth. For example, a cursor value related to sensitivity (e.g., a sensitivity value, a cursor sensitivity) can cause the cursor 20 to move a specified distance (e.g., a specified number of pixels) in response to a specified physical movement of the cursor device 140. A cursor value related to acceleration (e.g., an acceleration value) can cause the cursor 20 to have an accelerated movement on the display 120 in response to a physical movement (e.g., a sudden physical movement) of the cursor device 140 at a specified speed. More details related to cursor values are discussed in connection with the figures below.

In this embodiment, the computing device 100 can include a cursor device adjustment module (not shown) configured to calibrate (e.g., automatically calibrate) the responsiveness of the cursor device 140 based on movements of the cursor device 140 by a user. The automatic calibration of the responsiveness of the cursor device 140 can be performed (e.g., performed dynamically) while the user is using one or more applications operating at the computing device 100. Specifically, the cursor device adjustment module can be configured to calculate one or more cursor values that can affect the responsiveness (e.g., associated with cursor responsiveness parameters) of the cursor 20 at the computing device 100 in response to movements of the cursor device 140 caused by the user. In some embodiments, the responsiveness of the cursor device 140 can be calculated based on cursor device calibration feedback (e.g., within a cursor device calibration feedback loop). A block diagram example of a computing device that includes a cursor device adjustment module is shown and described in more detail in connection with FIG. 2.

For example, during a cursor device calibration feedback loop, the cursor device adjustment module can be configured to determine that a behavior of the cursor 20 deviates from an expected (e.g., predicted) cursor behavior and/or matches a predefined error behavior. Based on this determination, the cursor device adjustment module can be configured to calculate a cursor value that can modify the responsiveness of the cursor device 140 so that subsequent movements of the cursor device 140 caused by the user can result in desirable cursor behaviors of the cursor 20. The cursor values can be stored at the computing device 100 in a cursor device profile (also can be referred to as a cursor profile) associated with the cursor device 140. Thus, the cursor device 140 can be calibrated by cursor device adjustment module based on a cursor device calibration feedback loop so that behavior of the cursor 20 will accurately reflect desirable cursor behavior in response to the movements of the cursor device 140 by the user.

In some embodiments, the cursor device adjustment module can be configured to identify repeated overshoot cursor behaviors as an indicator that the responsiveness of the cursor device 140 is not calibrated to the movements (e.g., natural movements) of a user. The overshoot cursor behavior, which can be a predefined error behavior, can be identified (e.g., characterized) as such based on a path of the cursor looping back to an intended target location (e.g., target cursor location). Accordingly, the cursor device adjustment module can be configured to modify one or more cursor values related to the responsiveness (e.g., associated with cursor responsiveness parameters) of the cursor device 140 so that the responsiveness of the cursor device 140 can be calibrated for the user (e.g., for the movements of the user) in a desirable fashion so that the overshoot cursor behavior can be avoided. Specific examples of expected cursor behaviors and/or predefined error behaviors are described for example in connection with FIGS. 4A through 4C.

Although shown in FIG. 1 as a mouse device separate from and wireless connected (e.g., wireless connected via Bluetooth technology) to the computing device 100, the cursor device 140 can be a different type of cursor device integrated into the computing device 100 and/or connected via a wire to the computing device 100. For example, in some embodiments, the cursor device 140 can be a trackpad device (e.g., an electrostatic touchpad) integrated into the computing device 100. In some embodiments, the cursor device 140 can be, for example, a trackball device.

In some embodiments, the display 120 can be any type of display. For example, in some embodiments, the display 120 can be a liquid crystal display (LCD). In some embodiments, the display 120 can be a touch sensitive display, which can be, or can include, for example, an electrostatic touchpad, a resistive touchscreen device, a surface acoustic wave (SAW) device, a capacitive touchscreen device, a pressure sensitive device, a surface capacitive device, a projected capacitive touch (PCT) device, and/or so forth.

Although shown in FIG. 1 as a laptop type device, in some embodiments, the computing device 100 can be any type of computing device. For example, the computing device 100 can be a wired device and/or a wireless device (e.g., wi-fi enabled device) and can be, for example, a computing entity (e.g., a personal computing device), a server device (e.g., a web server), a mobile phone, a personal digital assistant (PDA), e-reader device, and/or so forth. The computing device 200 can be configured to operate based on one or more platforms (e.g., one or more similar or different platforms) that can include one or more types of hardware, software, firmware, operating systems, runtime libraries, and/or so forth.

Figure 2:
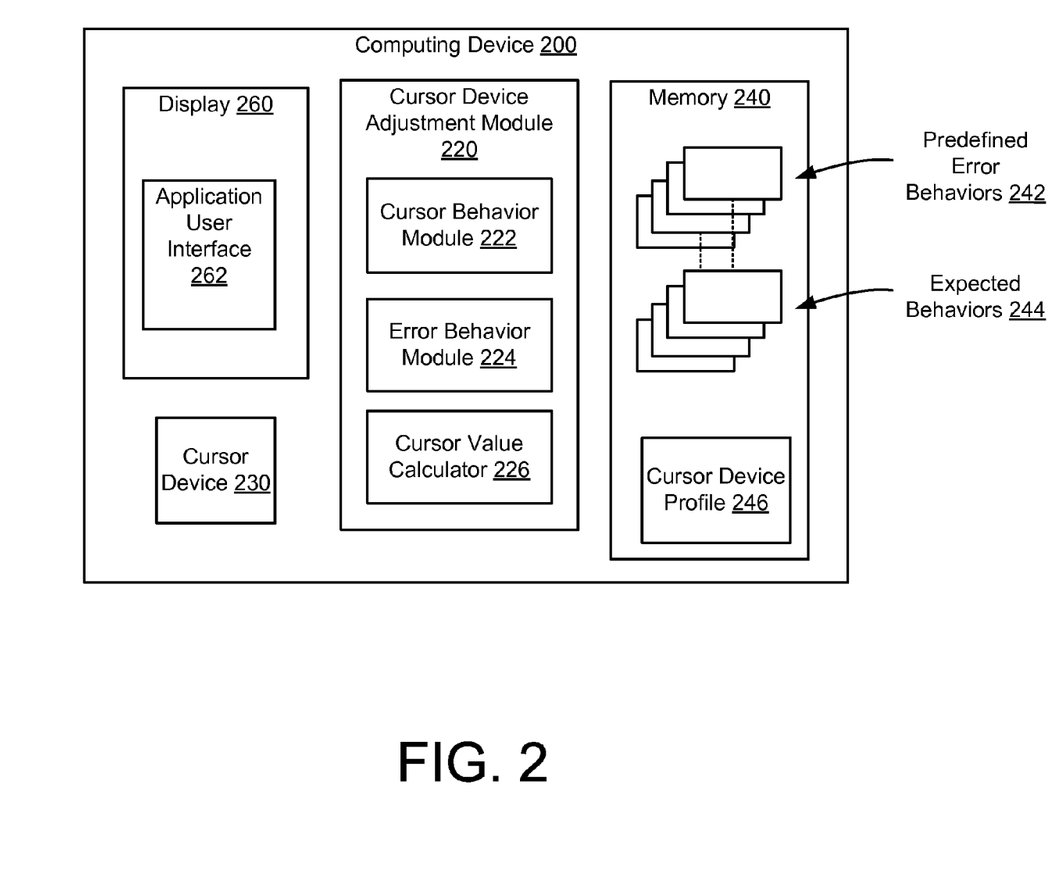
FIG. 2 is a block diagram that illustrates a computing device that includes a cursor device adjustment module configured to perform cursor device calibration.

FIG. 2 is a block diagram that illustrates a computing device 200 that includes a cursor device adjustment module 220 configured to perform cursor device calibration. As shown in FIG. 2, the cursor device adjustment module 220 includes a cursor behavior module 222, an error behavior module 224, and a cursor value calculator 226. The computing device 200 also includes a cursor device 230, a memory 240, and a display 260. Although illustrated in FIG. 2 as a cursor device that is integrated into the computing device 200, in some embodiments, the cursor device 230 can be a standalone device (e.g., a Bluetooth or universal serial bus (USB) mouse device) configured to be in communication (e.g., wireless or wired communication) with the computing device 200.

The cursor device 230 can be configured to control a cursor (not shown) that can be displayed (e.g., rendered) on the display 260. In some embodiments, the cursor device 230 can be configured to trigger a cursor behavior of the cursor when, for example, interacting with (e.g., moving over, selecting) an application user interface 262 displayed (e.g., rendered) on the display 260.

The cursor behavior module 222 is configured to receive and/or define data (e.g., one or more datapoints) associated with a cursor behavior triggered by a user. In other words, a cursor behavior can be represented by a collection of parameter values. Parameter values representing a cursor behavior (e.g., cursor interaction with a user interface) can include, for example, an acceleration value, a length value (representing a physical length of an interaction), a direction value, a timing value, a vector value, a duration value (representing a duration of an interaction), a speed value, and/or so forth. As a specific example, the cursor behavior can be represented by parameter values such as location values (e.g., XY coordinates) and/or time values, where the location values can represent locations within the display 260 and the time values can represent times when the cursor (or a portion thereof) is at locations represented by the location values. In some embodiments, at least a portion of a cursor behavior can be represented by one or more vector values. In some embodiments, the cursor behavior module 222 can be configured to log (e.g., record, define) data (e.g., location values, time values, vector values) associated with cursor movements so that cursor behaviors can be identified.

The error behavior module 224 is configured to compare one or more portions of a cursor behavior with one or more predefined error behaviors 242 and/or one or more expected behaviors 244, which also can be referred to as expected cursor behaviors. The error behavior module 224 can be configured to determine that the portion(s) of the cursor behavior match the one or more predefined error behaviors 242 and/or deviate (e.g., depart) from the one or more expected behaviors 244. If the portion(s) of the cursor behavior match the one or more predefined error behaviors 242, and/or if the portion(s) of the cursor behavior deviate from the one or more expected behaviors 244, the portion(s) of the cursor behavior can be identified as (e.g., characterized as) one or more error behaviors (also can be referred to as errant cursor behaviors). As shown in FIG. 2, at least some of the predefined error behaviors 242 can be associated with the expected behaviors 244 as represented by the dashed lines. In some embodiments, the cursor behavior may be identified as a non-error behavior when the cursor behavior (or a portion thereof) does not match one or more predefined error behaviors 242, and/or when the cursor behavior (or portion thereof) does not deviate from the one or more expected behaviors 244. In such instances, cursor values may not be modified based on the non-error behavior.

The cursor value calculator 226 can be configured to define at least a portion of one or more cursor values (e.g., cursor values associated with cursor responsiveness parameters) in response to the error behavior module 224 identifying at least a portion of a cursor behavior as an error behavior. In some embodiments, the portion of the one or more cursor values can be defined based on a magnitude of the deviation of the error behavior from an expected cursor behavior from the expected cursor behaviors 244. As mentioned above, in some embodiments, the expected cursor behavior can be associated with one or more of the predefined error behaviors 242. In other words, a predefined error behavior can be associated with an expected cursor behavior. In some embodiments, the one or more cursor values can be stored in a cursor device profile 246 associated with the cursor device 230.

Figure 3:
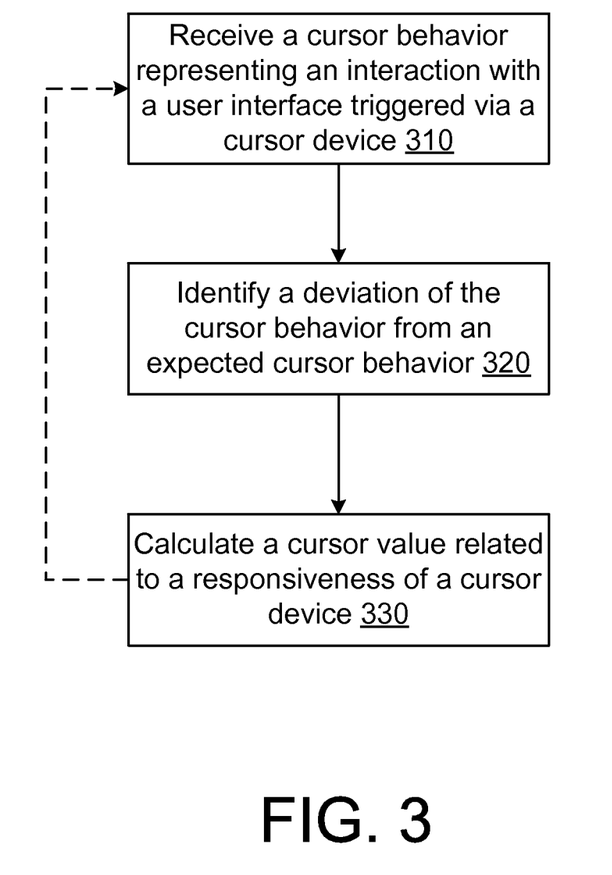
FIG. 3 is a flowchart that illustrates a method for defining a responsiveness of a cursor device.

FIG. 3 is a flowchart that illustrates a method for defining a responsiveness of a cursor device. The flowchart shown in FIG. 3 can be implemented using, for example, at least the cursor adjustment module 220 shown in FIG. 2. In some embodiments, the method shown in FIG. 3 can be referred to as a cursor device calibration feedback loop. The method can be referred to as a cursor device calibration feedback loop because a responsiveness of a cursor device can be calculated (e.g., calibrated) based on this method which uses cursor behaviors triggered by the cursor device.

As shown in FIG. 3, a cursor behavior representing an interaction with a user interface triggered via a cursor device can be received (block 310). The cursor behavior can be received at a cursor behavior module such as cursor behavior module 222 shown in FIG. 2. As discussed above, the cursor behavior can be a portion of a cursor behavior that is based on one or more location values, time values, vector values, and/or so forth.

A deviation of the cursor behavior from an expected behavior is identified (block 320). The deviation of the cursor behavior from the expected behavior can be identified by an error behavior module such as the error behavior module 224 shown in FIG. 2. In some embodiments, the cursor behavior can first be matched to a predefined error behavior. The predefined error behavior can be associated with an expected behavior that can then be used to determine a magnitude of the deviation of the cursor behavior from the expected behavior.

As an example, the cursor behavior can be matched to a predefined error behavior related to overshoot of a target location of the cursor. The expected behavior can be a direct (e.g., linear, shortest path) movement from a starting point of the cursor to the target location of the cursor. Thus, the overshoot of the cursor (as defined by the cursor behavior) can be identified as (e.g., characterized as) the deviation from the expected behavior.

A cursor value related to responsiveness of the cursor device is calculated based on the deviation (block 330). In some embodiments, the cursor value (associated with at least one cursor responsiveness parameter) can be based on a magnitude of the deviation of the cursor behavior from the expected behavior. In some embodiments, a magnitude of the cursor value can be based on a magnitude of the deviation of the cursor behavior from the expected behavior.

As illustrated by the dashed line, portions of the method can be performed multiple times, or iteratively. For example, a cursor value related to responsiveness of the cursor device can be calculated based on a cursor behavior during a first period of time (using the process shown in FIG. 3). The cursor value related to the responsiveness of the cursor device can be modified based on another cursor behavior during the second period of time (using the process shown in FIG. 3). Accordingly, the responsiveness of the cursor device can be continuously tuned based on cursor behaviors triggered by a user.

Figure 4A:
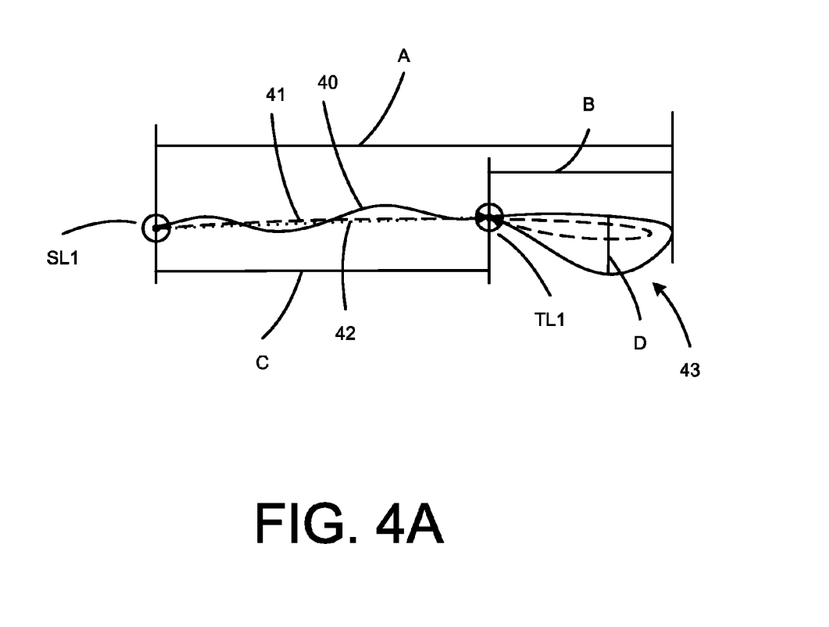
FIGS. 4A through 4C illustrate predefined error behaviors and expected cursor behaviors.
Figure 4B:
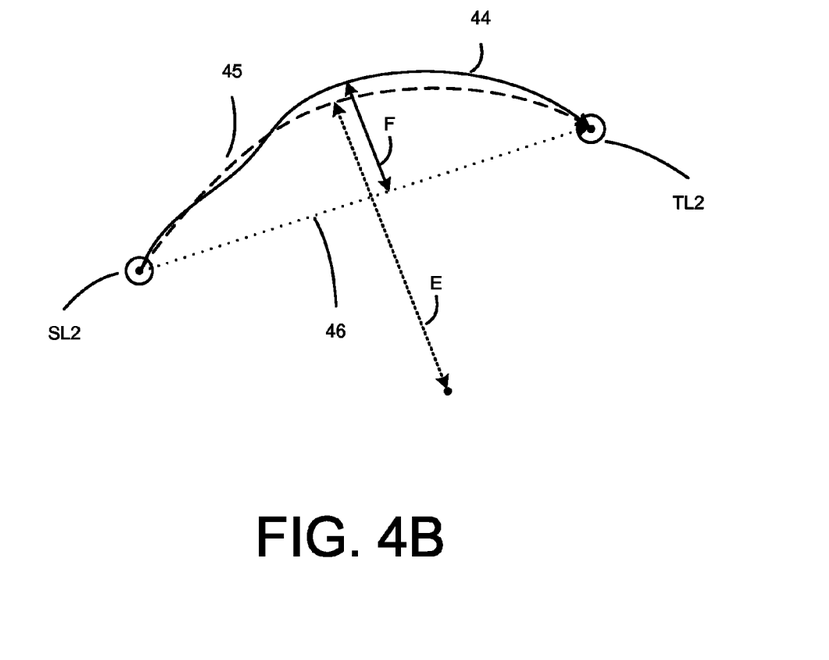
Figure 4C:
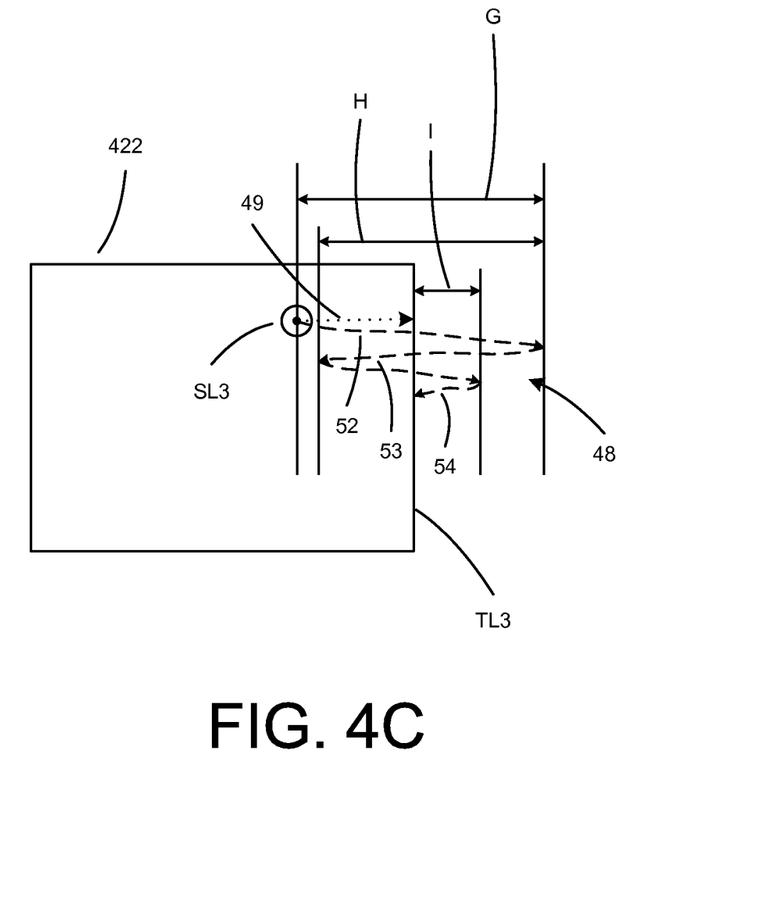

As mentioned above, predefined error behaviors and expected cursor behaviors are shown in FIGS. 4A through 4C. The predefined error behaviors and expected cursor behaviors shown in FIGS. 4A through 4C can be used in, for example, the method illustrated in FIG. 3 and/or by the cursor device adjustment module 220 shown in FIG. 2.

FIG. 4A illustrates a cursor behavior 40, a predefined error behavior 41, and an expected cursor behavior 42. The cursor behavior 40 is represented by a solid line and starts at a starting location SL1 and ends at a target location TL1. The cursor behavior 40 shown in FIG. 4A can be only a portion of a cursor behavior (e.g., a more extensive cursor behavior which is not shown).

The starting location SL1 (also can be a starting user interface component or element) can be determined (e.g., determined by the cursor behavior module 222 shown in FIG. 2) based on movement of the cursor being initiated by a user using a cursor device after a pause (e.g., a temporary pause). In some embodiments, the starting location SL1 can be determined based on an abrupt change in movement of the cursor triggered by a user via a cursor device.

The target location TL1 (also can be a target user interface component or element) can be determined (e.g., determined by the cursor behavior module 222 shown in FIG. 2) based on one or more user-triggered interactions with, for example, a portion of a user interface after the cursor has been moved from the starting location SL1. In some embodiments, the target location TL1 can be associated with, for example, an interaction with a user interface button (e.g., an "OK" button, a "SUBMIT" button).

As a specific example, a user may cause movement of the cursor using a cursor device (e.g., a mouse device) from the starting location SL1 to a portion of a user interface. When the cursor is at a portion of the user interface, the user may select (e.g., selected using a click action) a portion of the user interface using one or more buttons (e.g., mouse buttons) associated with the cursor device. The portion of the user interface can be identified as a target location (i.e., target location TL1) based on the selection of the portion of the user interface after the cursor has been moved from the starting location SL1. In some embodiments, a component (e.g., element) of a user interface may not be identified as a target location when an interaction with the component of the user interface, such as a selection of the component of the user interface, does not occur (e.g., is not performed by the user via the cursor device, does not occur within a specified period of time).

As shown in FIG. 4A, the cursor behavior 40 illustrates that the cursor starts at starting location SL1 and moves toward the target location TL1, but the cursor overshoots the target location TL1 and loops back to the target location TL1 until the target location TL1 is reached. Thus, the cursor behavior 40 represents an overshoot behavior of a target location and has an overshoot portion 43. As shown in FIG. 4A, a distance A (also can be referred to as a total distance or length) of the cursor behavior 40 is greater than a distance C (e.g., a length) (also can be referred to as a non-overshoot distance) between the starting location SL1 and the target location TL1. Also, as shown in FIG. 4A, the cursor behavior 40 has an overshoot distance B (also can be referred to as an overshoot length), and the overshoot portion 43 of the cursor behavior 40 has a width D.

The cursor behavior 40 can be identified (e.g., identified by the error behavior module 224 shown in FIG. 2) as an error behavior when the cursor behavior 40 is matched with (e.g., matched based on a comparison with) a description of a predefined error behavior. The description of the predefined error behavior can be am overshoot of a target location and reversal of direction back (e.g., looping back) to the target location.

The predefined error behavior 41 (shown as a dashed line) is a representation of an overshoot error behavior. In some embodiments, the cursor behavior 40 can be identified as an error behavior when parameter values (e.g., location values, time values) representing the cursor behavior 40 are matched with (e.g., matched with within a specified error or tolerance, substantially matched with) parameter values defining the predefined error behavior 41.

The expected cursor behavior 42 (which is represented as a dotted line) represents an expected cursor behavior of a cursor movement between starting location SL1 of the target location TL1. In this embodiment, the expected cursor behavior 42 is approximately a straight line between the starting location SL1 and the target location TL1, and is approximately the distance C. In some embodiments, the expected cursor behavior 42 may not be a straight line between the starting location SL1 and the target location TL1.

In some embodiments, the cursor behavior 40 can be identified (e.g., identified by the error behavior module 224 shown in FIG. 2) as an error behavior when the cursor behavior 40 deviates from the expected cursor behavior 42. In some embodiments, the cursor behavior 40 may be identified as an error behavior when the cursor behavior 40 deviates from the expected behavior 42 beyond a threshold amount (e.g., threshold value, threshold error value). In some embodiments, the cursor behavior 40 may be identified as an error behavior when the distance B and/or the width D of the overshoot portion 43 of the cursor behavior 40 is greater than a threshold value. In some embodiments, the cursor behavior 40 may be identified as an error behavior when a ratio of the distance B (and/or width D) to the distance A and/or the distance C (between the starting location SL1 and the target location TL1) exceeds a threshold value.

One or more cursor values related to responsiveness (e.g., associated with cursor responsiveness parameters) of a cursor device (using to produce the cursor behavior 40) can be calculated (e.g., defined, modified) based on the deviation from the expected behavior 42. For example, a magnitude of a sensitivity value of the cursor device can be calculated based on a magnitude of the deviation (e.g., distance B) of the cursor behavior 40 from the expected behavior 42. In some embodiments, the sensitivity value of the cursor device can be decreased proportional to the overshoot distance B (and/or width D) so that overshoot such as that represented by the cursor behavior 40 in FIG. 4A may be avoided. In some embodiments, one or more cursor values may be defined based on a ratio of the distance B to the distance A and/or the distance C.

In some embodiments, a sensitivity value of a cursor device in a vertical direction and/or a sensitivity value of the cursor device in a horizontal direction can be calculated (e.g., define, modified) based on the cursor behavior 44 being identified as an overshooting-type error behavior. The vertical sensitivity value and the horizontal sensitivity values can be referred to as per-axis values or as per-axis sensitivity values. For example, the overshoot movement of the cursor behavior 44 in a horizontal direction beyond the target location TL1 can be used to adjust a sensitivity value of the cursor device so that movements of a cursor within a display in a horizontal direction in response to horizontal movements of a cursor device may be decreased (e.g., set at a relatively low value). Accordingly, overshoot of the target location TL1 in the horizontal direction may be decreased and/or avoided.

FIG. 4B illustrates a cursor behavior 44, a predefined error behavior 45, and an expected cursor behavior 46. The cursor behavior 44 is represented by a solid line and starts at a starting location SL2 and ends at a target location TL2. The cursor behavior 44 shown in FIG. 4B can be a portion of a cursor behavior (e.g., a more extensive cursor behavior that is not shown).

As shown in FIG. 4B, the cursor behavior 44 illustrates that the cursor starts at starting location SL2 and moves toward the target location TL2, but the cursor moves along an indirect path (e.g., along approximately a curved path) toward the target location TL2. As shown in FIG. 4B, the cursor behavior 44 has approximately a radius of curvature E, and has a maximum distance F from the expected cursor behavior 46.

The cursor behavior 44 can be identified (e.g., identified by the error behavior module 224 shown in FIG. 2) as an error behavior when the cursor behavior 44 is matched (or substantially matched with) with a description of a predefined error behavior between the starting location SL2 and the target location TL2, which in this example is an arc. The predefined error behavior 45 (shown as a dashed line) is a representation of an arcing error cursor behavior. In some embodiments, the cursor behavior 40 can be identified as an error behavior when parameter values (e.g., location values, time values) representing the cursor behavior 44 substantially define an arc.

In this embodiment, the expected cursor behavior 46 (which is represented as a dotted line) represents an expected cursor behavior of a cursor movement between starting location SL2 of the target location TL2. In this embodiment, the expected cursor behavior 46 is approximately a straight line between the starting location SL2 and the target location TL2. In some embodiments, the expected cursor behavior 42 may not be a straight line between the starting location SL2 and the target location TL2. In some embodiments, the cursor behavior 44 can be identified (e.g., identified by the error behavior module 224 shown in FIG. 2) as an error behavior when the cursor behavior 44 deviates from the expected cursor behavior 46.

In some embodiments, the cursor behavior 44 may be identified as an error behavior when the cursor behavior 44 deviates from the expected behavior 46 beyond a threshold amount (e.g., threshold value, threshold error value). In some embodiments, the cursor behavior 44 may be identified as an error behavior when the radius of curvature E and/or the distance F of the cursor behavior 44 is greater than a threshold value. In some embodiments, the cursor behavior 44 may be identified as an error behavior when a ratio of the radius of curvature E and/or the distance F to the distance between the starting location SL2 and the target location TL2 exceeds a threshold value.

One or more cursor values related to responsiveness (e.g., associated with cursor responsiveness parameters) of a cursor device (using to produce the cursor behavior 44) can be calculated (e.g., defined, modified) based on the deviation from the expected behavior 46. For example, a magnitude of a sensitivity value of the cursor device can be calculated based on a magnitude of the deviation (e.g., distance F) of the cursor behavior 44 from the expected behavior 46. In some embodiments, the sensitivity value of the cursor device can be decreased proportional to when the radius of curvature E and/or the distance F of the cursor behavior 44 so that arcing behavior represented by the cursor behavior 44 in FIG. 4B may be avoided.

In some embodiments, a sensitivity value of a cursor device in a vertical direction and/or a sensitivity value of the cursor device in a horizontal direction can be calculated (e.g., define, modified) based on the cursor behavior 44 being identified as an arcing type error behavior. For example, the trajectory of the cursor behavior 44 in a vertical direction away from the expected behavior 46 can be used to adjust a sensitivity value of the cursor device so that movements of a cursor within a display in a vertical direction in response to vertical movements of a cursor device may be decreased (e.g., set at a relatively low value).

FIG. 4C illustrates a cursor behavior 48 and an expected cursor behavior 49. The cursor behavior 48 is represented by a solid line and starts at a starting location SL3 and ends at a target location TL3. In this embodiment, target location TL3 is an edge (which can be used for resizing) of a user interface component 422. The cursor behavior 48 shown in FIG. 4C can be a portion of a cursor behavior (e.g., a more extensive cursor behavior). As shown in FIG. 4C, the cursor behavior 48 illustrates that the cursor starts at starting location SL3 and moves along an indirect path (e.g., zigzag path) around and toward the target location TL3. As shown in FIG. 4C, the cursor behavior 48 has several portions—portion 52 (which has length G), portion 53 (which has length H), and portion 54 (which has length I).

The cursor behavior 48 can be identified (e.g., identified by the error behavior module 224 shown in FIG. 2) as an error behavior when the cursor behavior 48 is matched (or substantially matched with) with a description of a predefined error behavior between the starting location SL3 and the target location TL3. In this embodiment, the predefined error behavior is a zigzag path around the target location. Thus, when the cursor behavior 48 defines at least a portion of a zigzag path around the target location TL3 (as shown in FIG. 4C), the cursor behavior 48 can be identified as (e.g., characterized as) an error behavior. In some embodiments, the cursor behavior 48 can be identified as an error behavior when parameter values (e.g., location values, time values) representing the cursor behavior 48 substantially define a zigzag path around the target location TL3.

In this embodiment, the expected cursor behavior 49 (which is represented as a dotted line) represents an expected cursor behavior of a cursor movement between starting location SL3 of the target location TL3. In this embodiment, the expected cursor behavior 49 is approximately a straight line between the starting location SL3 and the target location TL3. In some embodiments, the expected cursor behavior 42 may not be a straight line between the starting location SL3 and the target location TL3. In some embodiments, the cursor behavior 48 can be identified (e.g., identified by the error behavior module 224 shown in FIG. 2) as an error behavior when the cursor behavior 48 deviates from the expected cursor behavior 49 as shown in FIG. 4C.

In some embodiments, the cursor behavior 48 may be identified as an error behavior when the cursor behavior 48 deviates from the expected behavior 49 beyond a threshold amount (e.g., threshold value, threshold error value). In some embodiments, the cursor behavior 48 may be identified as an error behavior when one or more of the lengths (or distances) G, H, I are greater than a threshold value. In some embodiments, the cursor behavior 48 may be identified as an error behavior when a ratio of the lengths (or distances) G, H, I to the distance between the starting location SL3 and the target location TL3 exceeds a threshold value.

One or more cursor values related to responsiveness of a cursor device (used to produce the cursor behavior 48) can be calculated (e.g., defined, modified) based on the deviation from the expected behavior 49. For example, a magnitude of a sensitivity value of the cursor device can be calculated based on a magnitude of the deviation of the cursor behavior 48 from the expected behavior 49. As a specific example, the magnitude of the sensitivity value of the cursor device can be calculated based on the difference between one or more of the lengths G, H, I and the distance between the starting location SL3 and the target location TL3. In some embodiments, one or more cursor values associated with a cursor device can be calculated based on the number (e.g., a threshold number) of passes over the target location TL3.

In some embodiments one or more portions of a cursor behavior can be ignored (e.g., discarded) when identifying (e.g., determining) whether or not the cursor behavior(s) are an error behavior and/or when calculating one or more cursor values related to a responsiveness (e.g., associated with cursor responsiveness parameters) of a cursor device. For example, in some embodiments, the slight deviations (e.g., noise, wavy behavior) of the cursor behavior 40 shown in FIG. 4A from the expected cursor behavior 42 between the starting location SL1 of the target location TL1 may be ignored when identifying the cursor behavior 40 as an error behavior and/or when calculating one or more cursor values related to the responsiveness of the cursor device. As another example, in some embodiments, the slight deviations (e.g., noise, wavy behavior) of the cursor behavior 44 shown in FIG. 4B from the predefined error behavior 45 between the starting location SL2 of the target location TL2 may be ignored when identifying the cursor behavior 44 as an error behavior and/or when calculating one or more cursor values related to the responsiveness of the cursor device. In some embodiments, a cursor behavior may be entirely discarded (e.g., ignored) and may not be used during a cursor device calibration feedback loop because the cursor behavior occurs slowly (e.g., outside of a threshold period of time), which can be indicative of inadvertent and/or browsing-type movements rather than as deliberate movements toward a target location.

In some embodiments, a cursor behavior can be approximated as a behavior (e.g., a predefined error behavior) so that one or more cursor values (associated with cursor responsiveness parameters) can be calculated in a desirable fashion. By so doing, slight variations and/or deviations that are included in the cursor behavior may not introduce inaccuracies into calculations of one or more cursor values. Thus, the cursor behavior can be used to define an approximated behavior that can be used calculate one or more cursor values. As a specific example, the cursor behavior 44 can be approximated as the predefined error behavior 45 so that one or more cursor values can be calculated based on the predefined error behavior 45 (rather than on the actual cursor behavior 44). Accordingly, slight variations and/or deviations that are included in the cursor behavior 44 may not be included in the calculations of one or more cursor values.

In some embodiments, one or more cursor values may not be calculated until an error behavior is identified multiple times. For example, one or more cursor values may not be calculated (e.g., modified) until an arcing cursor behavior (such as that shown in FIG. 4B) has been identified more than three times. In some embodiments, an arcing cursor behavior may not be counted against the threshold number of behaviors unless the arcing cursor behavior deviates from unexpected cursor behavior by a threshold value (e.g., a threshold distance).

Although not shown in FIGS. 4A through 4C, in some embodiments, an error behavior may be associated with multiple locations (e.g., multiple user interface locations). For example, an error cursor behavior may be identified based on movements of a cursor between more than two locations (e.g., a starting location, an intermediate location, and a target location).

In some embodiments, one or more cursor values (associated with cursor responsiveness parameters) can be calculated based on historical data associated with one or more cursor behaviors. For example, parameter values associated with one or more cursor behaviors can be stored and can be later analyzed by, for example, the cursor device adjustment module 220 to calculate one or more cursor values.

The cursor behaviors, predefined error behaviors, and expected behaviors shown and described in connection with FIGS. 4A through 4C are presented by way of example only. Other types of error behaviors, cursor behaviors, and/or expected behaviors can be used to calculate one or more cursor values. For example, error behaviors related to undershooting a target location and/or cursor behaviors that are relatively slow (e.g., that take longer than a threshold period of time) can also be used to define one or more cursor values. These types of error behaviors and/or cursor behaviors can be indicators that, for example, a sensitivity value related to a responsiveness of the cursor device should be increased in magnitude.

Referring back to FIG. 2, one or more cursor values calculated by the cursor device adjustment module 220 can be stored in the cursor device profile 246. In some embodiments, one or more cursor values calculated by the cursor device adjustment module 220 can be used to replace one or more cursor values stored in the cursor device profile 246. In some embodiments, the cursor device profile 246 can be a default cursor device profile that includes default cursor values that may be modified by the cursor device adjustment module 220. In some embodiments, the cursor device profile 246 can include user-defined cursor values that may be modified by the cursor device adjustment module 220.

In some embodiments, the cursor device profile 246 can be an application-specific cursor device profile. For example, the cursor device profile 246 can be associated with a gaming application, and another cursor device profile (not shown) can be associated with general-purpose processing and/or other applications. In some embodiments, the cursor device profile (such as the cursor device profile 246) associated with a particular application may only be modified by the cursor device adjustment module 220 based on cursor interactions with the particular application.

In some embodiments, the cursor device profile 246 can be a cursor device specific profile (e.g., cursor device type profile). For example, the cursor device profile 246 can be associated with a first cursor device (such as cursor device 230), and another cursor device profile (not shown) can be associated with a second cursor device. In some embodiments, the cursor device profile (such as the cursor device profile 246) associated with a particular cursor device may only be modified by the cursor device adjustment module 220 based on cursor interactions with the particular cursor device.

In some embodiments, the cursor device adjustment module 220 can be configured to dynamically calculate (e.g., make adjustments to) one or more cursor values associated with the cursor device and/or an application. In other words, the cursor device adjustment module 220 can be configured to calculate one or more cursor values during operation (e.g., runtime, runtime mode) of the application. In some embodiments, the cursor device adjustment module 220 can be used to calculate cursor values during a calibration time period (based on a series of cursor-related tests) before and/or after operation of one or more applications.

In some embodiments, the cursor device adjustment module 220 may be deactivated by a user (e.g., based on input from a user) of the computing device 200. For example, the cursor device adjustment module 220 may be deactivated (e.g., temporarily deactivated) so that one or more cursor values (associated with one or more cursor responsiveness parameters) may not be calculated during use of the computing device 200 and/or during use of a specific application operating at the computing device 200.

In some embodiments, the cursor device adjustment module 220 can be configured to make incremental changes to one or more cursor values. The changes to the one or more cursor values can be made incrementally so that use of a cursor device by a user may not be disrupted by immediate changes having a large magnitude. For example, the cursor device adjustment module 220 can be configured to calculate a magnitude of a cursor value adjustment based on a cursor behavior deviating from an expected cursor behavior. Rather than adjust the cursor value based on the calculated magnitude, the cursor device adjustment module 220 can be configured to adjust the cursor value based on only a portion of the magnitude.

In some embodiments, the cursor device adjustment module 220 can be configured to make incremental changes to one or more cursor values (associated with one or more cursor responsiveness parameters) in an iterative fashion. For example, the cursor device adjustment module 220 can be configured to calculate a first magnitude of a cursor value adjustment based on a first cursor behavior deviating from an expected cursor behavior. The cursor device adjustment module 220 can be configured to adjust the cursor value based on only a portion of the first magnitude. The cursor device adjustment module 220 can be configured to later calculate a second magnitude of the cursor value adjustment based on a second cursor behavior deviating from an expected cursor behavior. The cursor device adjustment module 220 can be configured to adjust the cursor value based on only a portion of the second magnitude.

In some embodiments, the cursor device adjustment module 220 can be configured to calculate (e.g., make adjustments to) one or more cursor values on a regular basis, periodically, during different time periods, and/or so forth. For example, the cursor device adjustment module 220 can be configured to calculate one or more cursor values based on a regular maintenance schedule.

In some embodiments, the cursor device adjustment module 220 can be configured to select a cursor device profile from a library of cursor device profiles (not shown) based on a cursor behavior. Each cursor device profile from library of cursor device profiles can have various responsiveness characteristics that may be desirable for certain users, certain cursor devices, and/or to correct certain error behaviors. For example, a cursor behavior can be identified as an error behavior by the cursor device adjustment module 220 because the cursor behavior exhibits overshooting of a target location. In response to the cursor behavior being identified as an error behavior, the cursor device adjustment module 220 can be configured to select a cursor device profile that includes lower sensitivity cursor values than cursor values included in a cursor device profile used to produce the overshooting cursor behavior. The cursor to device profile including the lower sensitivity cursor values can be selected by the cursor device adjustment module 220 from a library of cursor device profiles having various responsiveness characteristics.

In some embodiments, one or more portions of the components shown in the computing device 200 in FIG. 2 can be, or can include, a hardware-based module (e.g., a digital signal processor (DSP), a field programmable gate array (FPGA), a memory), a firmware module, and/or a software-based module (e.g., a module of computer code, a set of computer-readable instructions that can be executed at a computer). For example, in some embodiments, one or more portions of the cursor device adjustment module 220 can be, or can include, a software module configured for execution by at least one processor (not shown). In some embodiments, the functionality of the components can be included in different modules and/or components than those shown in FIG. 2. For example, although not shown, the functionality of the cursor device adjustment module 220 can be included in a different module than the cursor device adjustment module 220, or divided into several different modules (not shown).

In some embodiments, the computing device 200 can be included in a network. In some embodiments, the network can include multiple computing devices (such as computing device 200) and/or multiple server devices (not shown). Also, although not shown in FIG. 2, the computing device 200 can be configured to function within various types of network environments. For example, the network can be, or can include, a local area network (LAN), a wide area network (WAN), and/or so forth. The network can be, or can include, a wireless network and/or wireless network implemented using, for example, gateway devices, bridges, switches, and/or so forth. The network can include one or more segments and/or can be have portions based on various protocols such as Internet Protocol (IP) and/or a proprietary protocol. The network can include at least a portion of the Internet.

Memory 240 can be any type of memory device such as a random-access memory (RAM) component or a disk drive memory. As shown in FIG. 2, the memory 240 is a local memory included in the computing device 200. Although not shown, in some embodiments, the memory 240 can be implemented as more than one memory component (e.g., more than one RAM component or disk drive memory) within the computing device 200. In some embodiments, the memory 240 can be, or can include, a non-local memory (e.g., a memory not physically included within the computing device 200) within a network (not shown). For example, the memory 240 can be, or can include, a memory shared by multiple computing devices (not shown) within a network. In some embodiments, the memory 240 can be associated with a server device (not shown) on a client side of a network and can be configured to serve several computing devices on the client side of the network.

Figure 5:
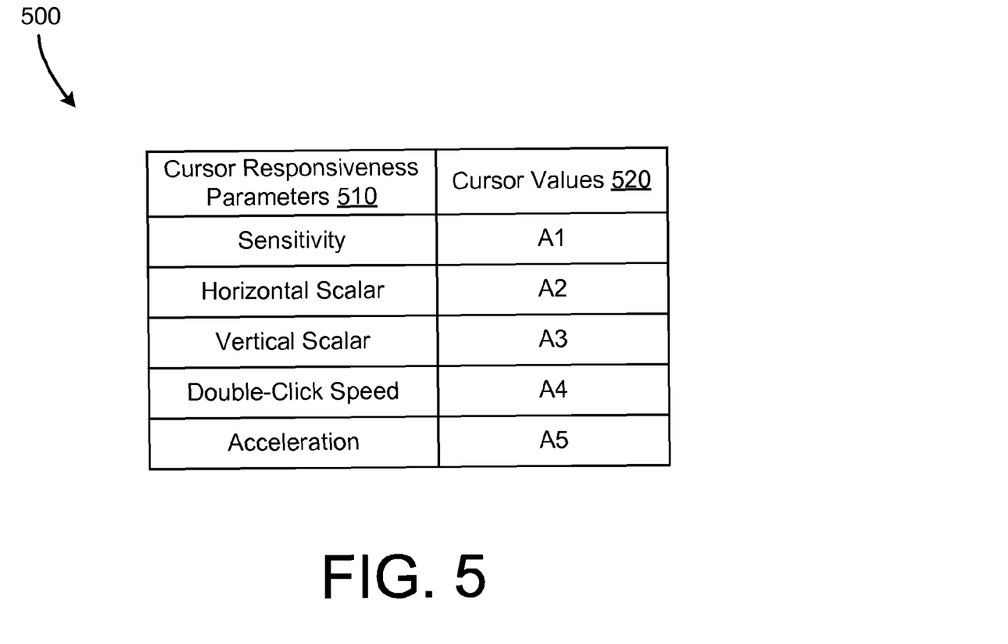
FIG. 5 is a diagram that illustrates cursor responsiveness parameters and associated cursor values, according to an embodiment.

FIG. 5 is a diagram that illustrates cursor responsiveness parameters 510 and associated cursor values 520, according to an embodiment. As shown in FIG. 5, the cursor response to parameters 510 include a sensitivity, a horizontal scaler, vertical scaler, a double-click speed, and an acceleration. The cursor responsiveness parameters and associated cursor values 520 shown in FIG. 5 are presented by way of example only. Additional cursor responsiveness parameters 510 and/or cursor values 520 (such as scrolling speed) can be associated with a cursor device and/or an application. In some embodiments the cursor responsiveness parameters 510 and/or cursor values 520 can be included in a cursor profile such as the cursor device profile 246 shown in FIG. 2.

The sensitivity (e.g., the sensitivity value) (shown in column 510) can cause a cursor to move a specified distance (e.g., a specified number of pixels) in response to a specified physical movement of a cursor device. The horizontal scalar (e.g., horizontal scalar value) (shown in column 510) can be a sensitivity value in a horizontal direction, and the vertical scalar (e.g., vertical scalar value) (shown in column 510) can be a sensitivity value in a vertical direction. The double-click speed (shown in column 510) can be related to a speed between clicks of a mouse to trigger a particular function of a computing device. A cursor value related to acceleration (e.g., the acceleration value) (shown in column 510) can cause a cursor to have an accelerated movement on a display in response to a physical movement of the cursor device at a specified speed.

Figure 6:
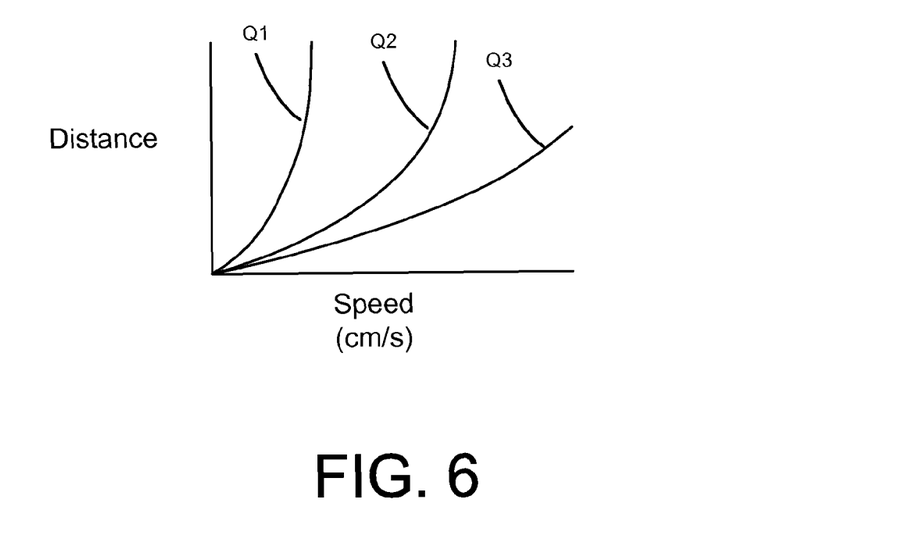
FIG. 6 is a graph that illustrates acceleration curves, according to an embodiment.

FIG. 6 is a graph that illustrates acceleration curves Q1 through Q3, according to an embodiment. As shown in FIG. 6, distance is shown on the y-axis and speed (in centimeters per second (cm/s)) is shown on the x-axis. In some embodiments, a cursor device adjustment module such as the cursor device adjustment module 220 shown in FIG. 2 can be configured to select one or more of the acceleration curves based on a determination that a cursor behavior matches an error cursor behavior or deviates from an expected behavior. For example, a cursor device may be configured to operate based on the acceleration curve Q2. In response to a cursor device adjustment module determining that a cursor behavior (or a set of cursor behaviors) deviates from expected behavior, the cursor device adjustment module can be configured to select acceleration curve Q3 for use with the cursor device.

Figure 7:
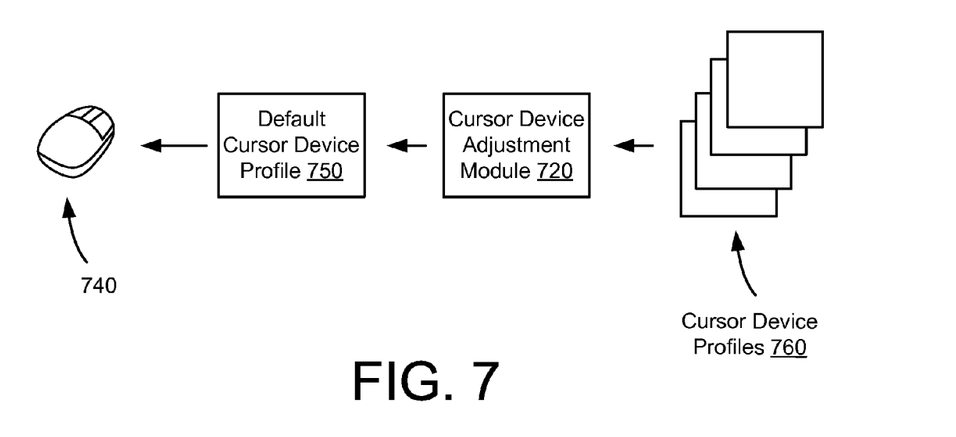
FIG. 7 is a diagram that illustrates a cursor device adjustment module configured to define a default cursor device profile.

FIG. 7 is a diagram that illustrates a cursor device adjustment module 720 configured to define a default cursor device profile 750. As shown in FIG. 7, the cursor device adjustment module 720 is configured to define the default cursor device profile 750 based on multiple cursor device profiles 760. In this embodiment, the default cursor device profile 750 is associated with a cursor device 740. In some embodiments, the cursor device 740 can be a particular type of cursor device. Accordingly, a default cursor device profile may be defined for a particular type of cursor device based on the cursor device profiles 760.

The cursor device profiles 760 can be collected from multiple computing devices that can be associated with a variety of users. In such embodiments, the cursor device profiles 760 can be collected from multiple computing devices based on the users opting in to such information being collected. For example, one or more of the cursor device profiles 760 can be defined based on incremental adjustments produced at many computing devices (e.g., a network of computing devices used by various users). The incremental adjustments can be defined at the computing devices based on the cursor device calibration methods described above. Thus, the default cursor device profile 750 can be defined by the cursor device adjustment module 720 based on multiple cursor device profiles 760 that can each be separately calibrated (e.g., tuned) using a cursor device calibration feedback loop.

In some embodiments, one or more of the cursor values included in the default cursor device profile 750 can be defined based on, for example, a mathematical combination of the cursor values included in the cursor device profile 760. For example, one or more of the cursor values included in the default cursor device profile 750 can be defined based on, for example, an average of the cursor values included in the cursor device profile 760.

In some embodiments, the default cursor device profile 750, after being installed at the computing device (not shown), can be further modified using a cursor device adjustment module (not shown) operating at the computing device. For example, a cursor value included in the default cursor device profile 750 can be modified by the cursor device adjustment module at the computing device in response to a cursor behavior deviating from an expected behavior at the computing device.

Figure 8:
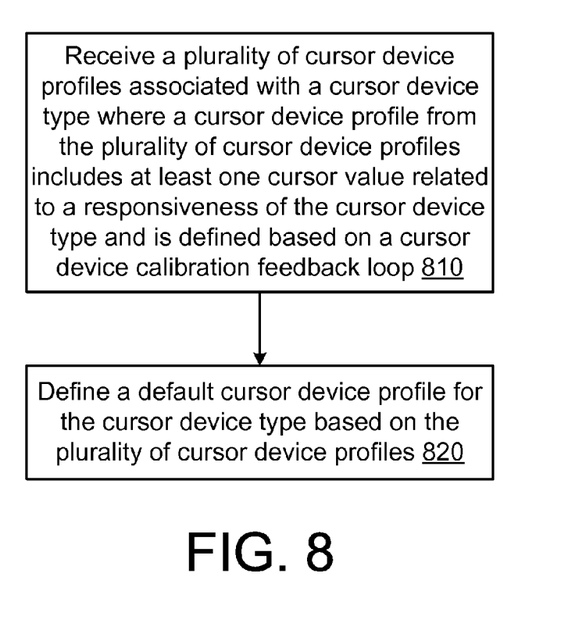
FIG. 8 is a flowchart that illustrates a method for defining a default cursor device profile based on multiple cursor device profiles.

FIG. 8 is a flowchart that illustrates a method for defining a default cursor device profile based on multiple cursor device profiles. As shown in FIG. 8, a plurality of cursor device profiles associated with a cursor device type can be received where a cursor device profile from the plurality of cursor device profiles can include at least one cursor value related to a responsiveness of the cursor device type and can be defined based on a cursor device calibration feedback loop (block 810). In some embodiments, the cursor device type can be, for example, associated with a particular model of cursor device (e.g., a trackpad device, a Bluetooth mouse produced by particular vendor). The cursor device calibration feedback loop can be based on the method described in connection with FIG. 3.

A default cursor device profile can be defined for the cursor device type based on the plurality of cursor device profiles. In some embodiments, one or more of the cursor values included in the default cursor device profile can be defined based on one or more cursor values included in at least a portion of the plurality of cursor device profiles. For example a cursor value included in the default cursor device profile can be calculated based on an average of cursor values included in at least a portion of the plurality of cursor device profiles. In some embodiments, the default cursor device profile can be installed at a computing device and further modified based on a cursor device calibration feedback loop.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device (computer-readable medium, a non-transitory computer-readable storage medium, a tangible computer-readable storage medium) or in a propagated signal, for processing by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments. It should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described.

What is claimed is:

1. A non-transitory computer-readable storage medium storing instructions that when executed cause a local computing device to perform a process, the instructions comprising instructions to:
    install a default cursor device profile for a cursor device type at the local computing device, the default cursor device profile including a default cursor value defined based on a mathematical combination of a plurality of cursor values included in a plurality of cursor device profiles for the cursor device type, the default cursor value affecting a responsiveness of a cursor device associated with the cursor device type, the plurality of cursor device profiles being collected from multiple computing devices;
    receive a cursor behavior representing an interaction with an application window operating on the local computing device, the interaction being triggered via the cursor device associated with the cursor device type;
    identify a deviation of the cursor behavior within the application window from an expected cursor behavior, the expected cursor behavior being defined by the default cursor device profile; and
    modify the default cursor value based on the deviation.

2. The non-transitory computer-readable storage medium of claim 1, wherein the default cursor value is based on a magnitude of the deviation.

3. The non-transitory computer-readable storage medium of claim 1, further comprising instructions to:
    compare the cursor behavior with a predefined error behavior selected from a plurality of predefined error behaviors, the expected behavior is associated with the predefined error behavior.

4. The non-transitory computer-readable storage medium of claim 1, wherein the default cursor value is an incremental change to the responsiveness associated with an iterative procedure for adjusting the responsiveness of the cursor device.

5. The non-transitory computer-readable storage medium of claim 1, wherein the cursor behavior is a first cursor behavior performed starting at a first time, the expected cursor behavior is a first expected cursor behavior, the instructions further comprising instructions to:
    identify, at a second time after the first time, a deviation of a second cursor behavior from a second expected cursor behavior, and
    modify the default cursor value based on the deviation of the second cursor behavior.

6. The non-transitory computer-readable storage medium of claim 1, wherein the cursor behavior is associated with an application while the application is in a runtime mode.

7. The non-transitory computer-readable storage medium of claim 1, wherein receiving the identification and the calculation are performed while cursor device feedback calibration is activated,
    the instructions further comprising instructions to:
    deactivate the cursor device feedback calibration in response to an input from a user.

8. The non-transitory computer-readable storage medium of claim 1, wherein the default cursor value is related to at least one of an acceleration of the cursor, a cursor sensitivity, or a per-axis scalar value for the cursor sensitivity.

9. An apparatus, comprising:
    an error behavior module configured to compare a cursor behavior within an application window operating on a local computing device with a predefined error behavior associated with a cursor device type profile installed on the local computing device, the cursor behavior being triggered by a user of the local computing device via a cursor device associated with a cursor device type,
    the cursor device type profile being defined based on a mathematical combination of a plurality of cursor values included in a plurality of cursor device type profiles for the cursor device type, the plurality of cursor device type profiles being collected from multiple computing devices;
    the error behavior module configured to identify the cursor behavior as being an error behavior based on the comparison; and
    a cursor value calculator configured to calculate, in response to the identification of the cursor behavior as being an error behavior, a default cursor value affecting a responsiveness of the cursor device based on the cursor behavior.

10. The apparatus of claim 9, wherein:
    the error behavior module is configured to determine an expected behavior associated with the predefined error behavior,
    the cursor value calculator is configured to calculate the default cursor value based on a magnitude of a deviation of at least a portion of the cursor behavior from the expected behavior.

11. The apparatus of claim 9, wherein the predefined error behavior is selected from a library of predefined error behaviors based on the cursor behavior.

12. The apparatus of claim 9, further comprising:
    a cursor behavior module configured to identify a starting location of the cursor behavior and a target location of the cursor behavior,
    the error behavior module configured to determine an expected behavior based on the starting location and the target location of the cursor behavior,
    the cursor value calculator is configured to calculate the default cursor value based on a magnitude of a deviation of at least a portion of the cursor behavior from the expected behavior.

13. The apparatus of claim 9, wherein the cursor behavior is identified as being a repeated error behavior, the calculating is performed in response to the cursor behavior being identified as the repeated error behavior.

14. The apparatus of claim 9, wherein the cursor behavior is a first cursor behavior performed during a first period of time, the error behavior is a first error behavior,
    the error behavior module is configured to compare a second cursor behavior performed during a second period of time with the predefined error behavior, and to identify the second cursor behavior as being a second error behavior based on the comparison,
    the cursor value calculator is configured to modify the default cursor value in response to the identification of the second cursor behavior as being the second error behavior.

15. The apparatus of claim 9, wherein the cursor behavior is from a plurality of cursor behaviors, the predefined error behavior is from a plurality of predefined error behaviors,
    the cursor value calculator is configured to iteratively modify the default cursor value based on a plurality of comparisons of the plurality of cursor behaviors with the plurality of predefined error behaviors.

16. The apparatus of claim 9, wherein the cursor behavior is a first cursor behavior performed during a first period of time, the error behavior module is configured to compare a second cursor behavior performed during a second period of time with the predefined error behavior, and to identify the second cursor behavior as being a non-error behavior.

17. A non-transitory computer-readable storage medium storing instructions that when executed cause a local computing device to perform a process, the instructions comprising instructions to:

receive a plurality of cursor device profiles from multiple computer devices, each of the multiple computer devices associated with a cursor device type, each cursor device profile from the plurality of cursor device profiles including at least one cursor value related to a responsiveness of the cursor device type within an application window operating on the local computing device and being defined based on a cursor device calibration feedback loop; and define a default cursor device profile for the cursor device type based on a mathematical combination of cursor values included in the plurality of cursor device profiles.

18. The non-transitory computer-readable storage medium of claim 17, wherein the cursor device feedback calibration loop includes identifying a deviation of a cursor behavior from an expected cursor behavior.

19. The non-transitory computer-readable storage medium of claim 17, wherein the default cursor device profile includes a default cursor value, the instructions further comprising instructions to:

receive a cursor behavior representing an interaction with the application window triggered via the cursor device;

identify a deviation of the cursor behavior from an expected cursor behavior; and modify the default cursor value related to a responsiveness of the cursor device based on the deviation.

* * * * *